C. RUHE.
MACHINE FOR BRUSHING LEATHER.
APPLICATION FILED DEC. 2, 1915.
1,195,859.
Patented Aug. 22, 1916.
3 SHEETS—SHEET 3.
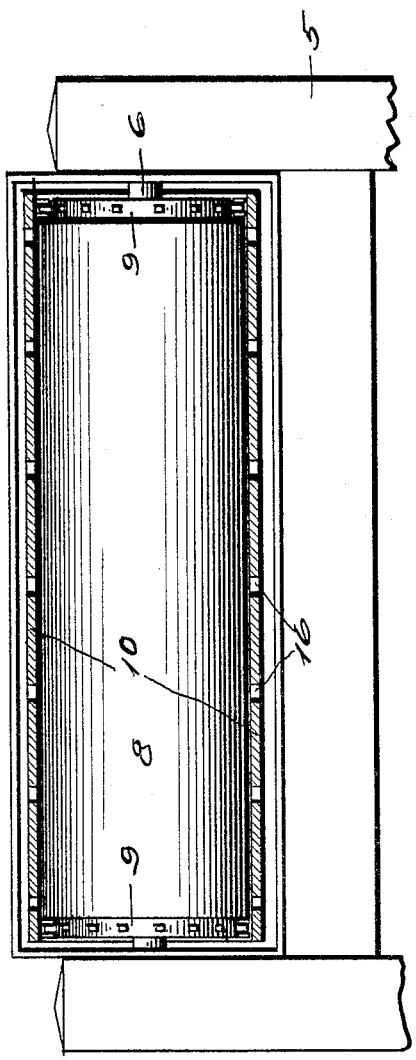
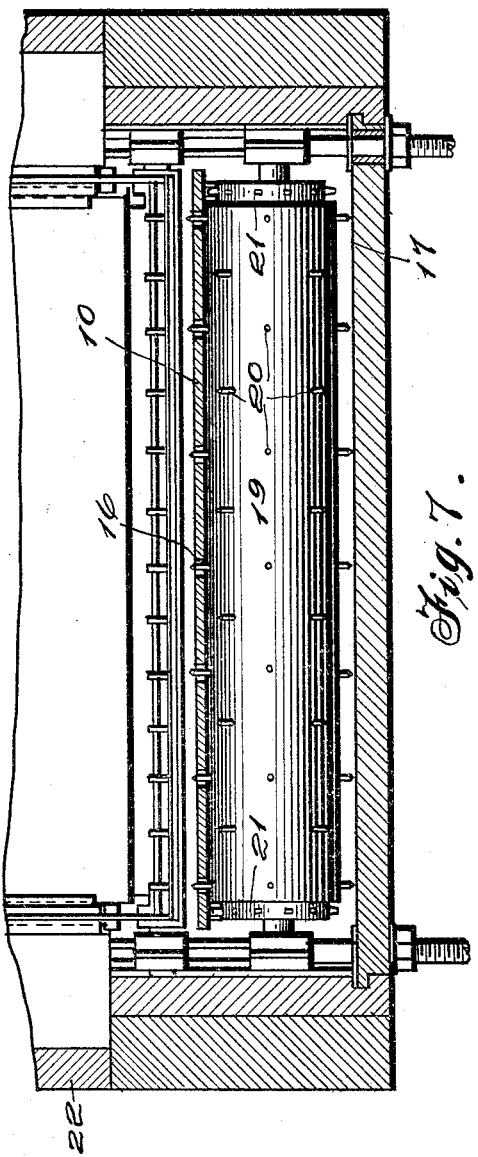

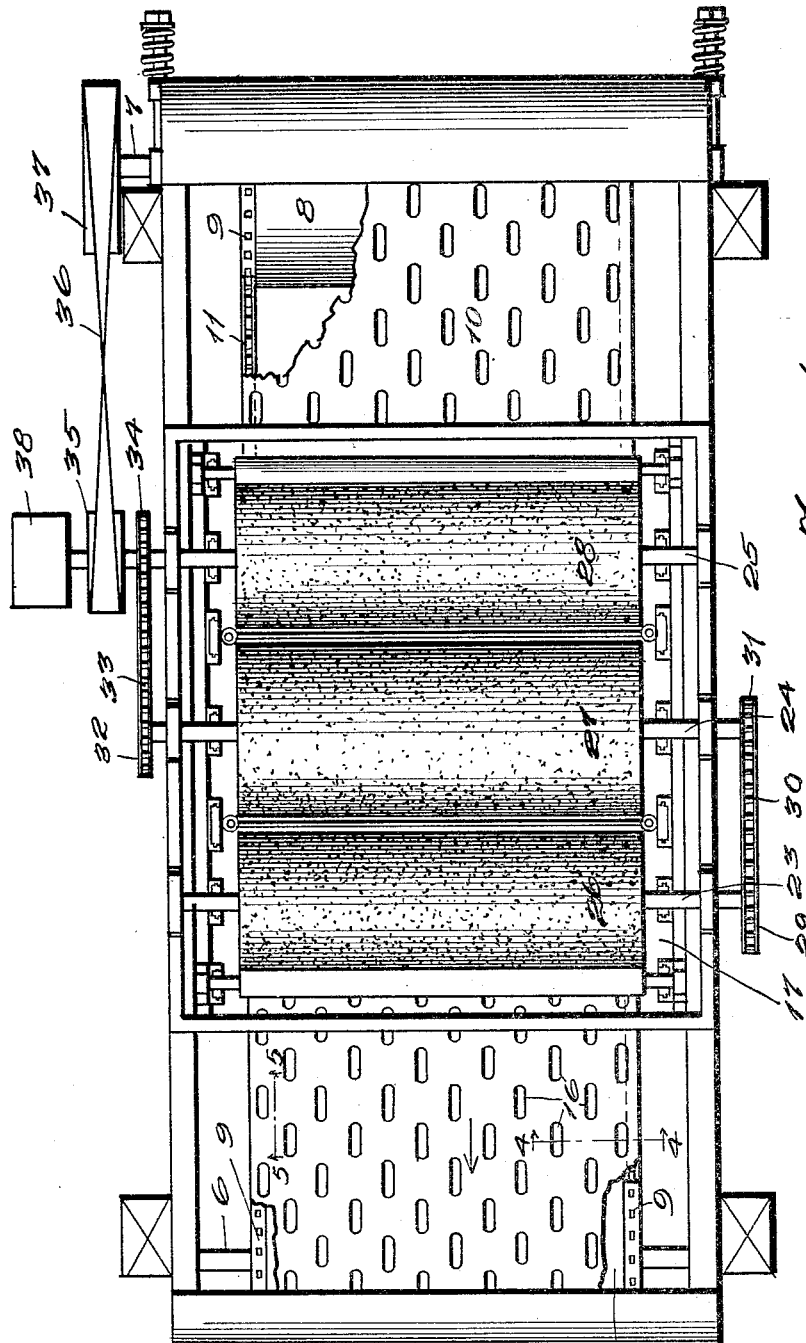

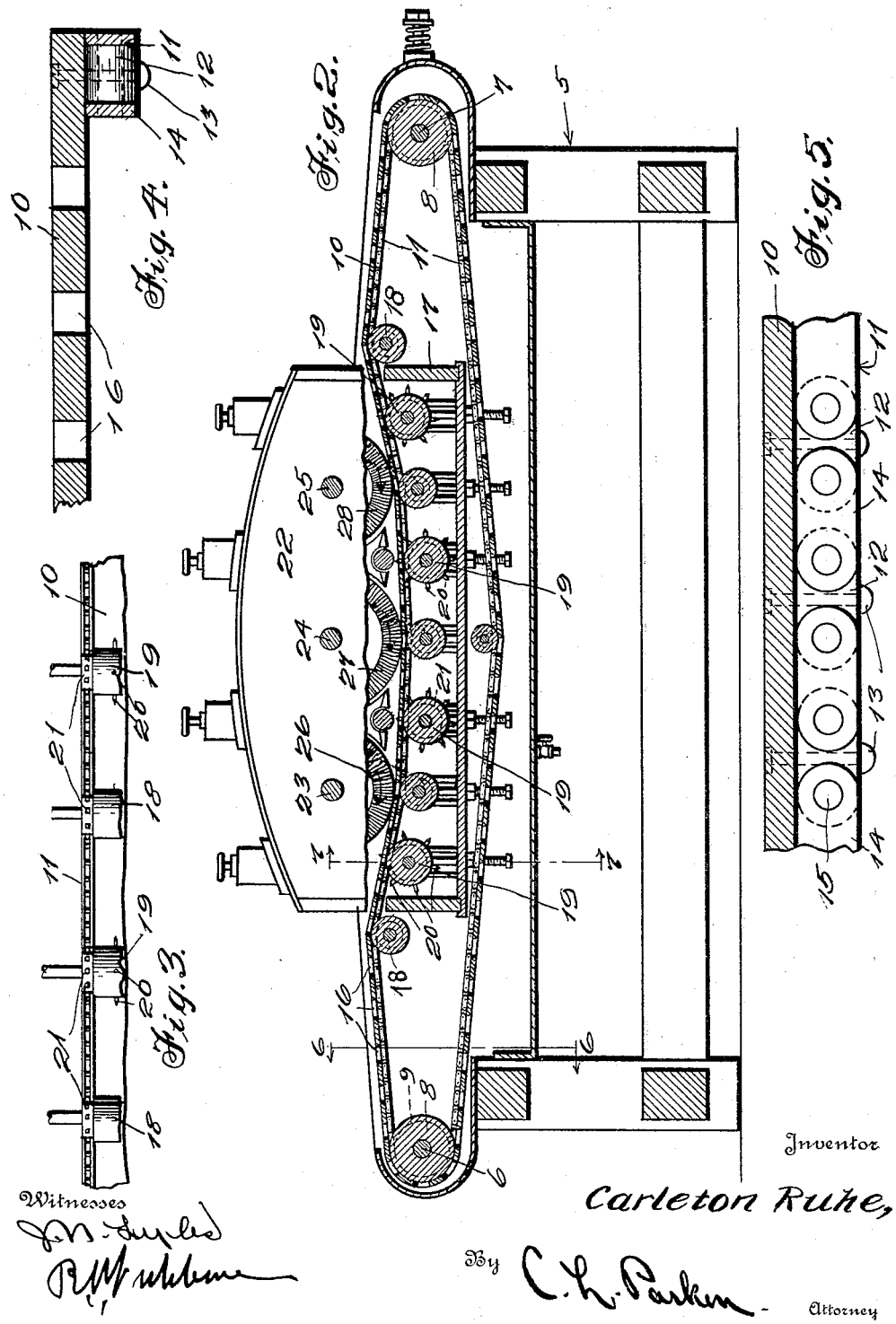

UNITED STATES PATENT OFFICE.

CARLETON RUHE, OF OLEAN, NEW YORK.

MACHINE FOR BRUSHING LEATHER.

1,195,859.  Specification of Letters Patent.  Patented Aug. 22, 1916.

Application filed December 2, 1915. Serial No. 64,756.

*To all whom it may concern:*

Be it known that I, CARLETON RUHE, a citizen of the United States, residing at Olean, in the county of Cattaraugus and State of New York, have invented certain new and useful Improvements in Machines for Brushing Leather, of which the following is a specification.

My invention relates to machines for cleaning, washing, or scrubbing leather, after the tanning thereof, while not necessarily restricted to such use, and has particular reference to improvements in such machines shown and described in United States Patent No. 1,154,341, granted to me under date of Sept. 21, 1915.

An important object of the invention is to improve in general the construction of such machines for rendering them more simple, reliable in operation, and durable.

Other objects and advantages of the invention will be apparent during the course of the following description.

In the accompanying drawings forming a part of this specification and in which like numerals are employed to designate like parts throughout the same, Figure 1 is a plan view of a machine embodying my invention, Fig. 2 is a central vertical longitudinal sectional view through the same, Fig. 3 is a fragmentary bottom plan view of the traveling support or endless conveyer, Fig. 4 is an enlarged fragmentary transverse sectional view through the traveling support or endless conveyer, taken on line 4—4 of Fig. 1, Fig. 5 is an enlarged fragmentary longitudinal sectional view through the same, taken on line 5—5 of Fig. 1, Fig. 6 is a vertical transverse sectional view taken on line 6—6 of Fig. 2, and, Fig. 7 is a similar view taken on line 7—7 of Fig. 2.

In the drawings, wherein for the purpose of illustration is shown a preferred embodiment of my invention, the numeral 5 designates a supporting structure or frame as a whole. Suitably mounted upon the ends of the supporting structure are horizontal transverse shafts 6 and 7, carrying end rollers 8, rigidly mounted thereon. Rigidly mounted upon the shafts 6 and 7, adjacent the opposite ends of each roll 8, are sprocket wheels 9, having smaller diameters, as shown.

The numeral 10 designates a traveling support or endless conveyer, which may be formed of leather, canvas or other suitable material. This traveling support or endless conveyer is mounted upon the end rolls 8, as shown. Arranged upon the inner side of the traveling support or endless conveyer 10 are endless sprocket chains 11, engaging the sprocket wheels 9 of the end rolls 8. As more clearly shown in Figs. 4 and 5, each sprocket chain embodies blocks 12, attached to the lower side of the endless conveyer, at its edge, by means of bolts or rivets 13. These blocks are connected by links 14, pivotally connected therewith by means of pins 15 or the like. The endless sprocket chains 11 operate outwardly of and adjacent the ends of the rolls 8. The endless conveyer 11 is provided with openings 16, for a purpose to be explained.

Suitably mounted upon the upper portion of the supporting structure and arranged within the endless conveyer is a trough 17 for containing water or the like, and having transverse horizontal guide rolls, arranged therein and adapted to contact with the lower side of the upper portion of the endless conveyer, between the sprocket chains 11, as shown. These guide rolls are suitably connected with the supporting structure 5. The end guide rolls 18 are disposed outwardly of the trough 17, as shown. Arranged alternately between the guide rolls 18 and suitably connected with the supporting structure are rolls 19, carrying upon their peripheries pointed elements or prongs 20, adapted to operate through and extending upwardly beyond the openings 16, to contact with the stock or leather carried thereon, for preventing the same from slipping.

In my United States Patent No. 1,154,341, the rolls 19 were turned by virtue of the prongs 20 operating within the openings 16. While this construction will operate with some degree of success, it has been found that the contact of the prongs with the walls of the openings in the traveling support tend to wear or injure such walls. To overcome this disadvantage, I arrange sprocket wheels 21 adjacent the opposite ends of each of the rolls 18 and 19, and these sprocket wheels are rigidly connected with the roll, to be turned therewith. The sprocket wheels 21 are arranged adjacent the edges of the traveling support 10 and their teeth permanently engage with the endless sprocket chains 11, whereby all of the rolls 18 and 19 are positively geared together and with the traveling support 10. It is apparent that these elements all rotate together whereby the strain is taken off of the prongs and the walls of the openings in the traveling support.

The numeral 22 designates a hood or housing, suitably mounted upon the upper portion of the supporting structure 5 and having transverse shafts 23, 24, and 25, journaled therethrough. These shafts carry horizontal rotatable brushes 26, 27, and 28, contacting with the upper surfaces of the traveling support, and permanently retaining such upper surface depressed, as indicated in Fig. 2, whereby the sprocket wheels 21 are permanently retained in operative engagement with the sprocket chains 11.

The shaft 23 has a sprocket wheel 29 rigidly connected therewith, engaged by a sprocket chain 30, engaging a sprocket wheel 31. This sprocket wheel 31 is rigidly mounted upon the shaft 24, having a sprocket wheel 32, rigidly connected with its opposite end. The sprocket wheel 32 is engaged by a sprocket chain 33, extending to the right for engagement with a sprocket wheel 34, carried by the shaft 25 and rigidly connected therewith. The shaft 25 has a pulley 35 rigidly connected therewith, engaged by a crossed belt 36, engaging a pulley 37, rigidly mounted upon the shaft 7. A pulley 38 is rigidly mounted upon the shaft 25, and receives rotation by means of a belt, not shown.

In operation, the traveling support or endless conveyer 10 is driven from right to left, as indicated by the arrow, and the stock or leather is fed upon the right hand end of the same. This stock or leather is carried by the traveling support beneath the rotating brushes 26, 27, and 28, the lower portions of which are traveling in the same direction with the endless belt. The stock is thus carried through the trough and subjected to the action of the rotating brushes, in the presence of the cleansing liquid in the trough. The stock is prevented from slipping upon the endless belt by the prongs 20.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described the invention, I claim:

1. In a machine of the character described, a supporting structure, end rolls connected therewith, sprocket wheels arranged near the ends of the rolls and attached thereto for rotation therewith, an endless belt passed about the end rolls and having openings, sprocket chains secured to the inner side of the endless belt and engaging the sprocket wheels, rolls arranged beneath the upper portion of the endless belt and provided with prongs operating within the openings formed therein, sprocket wheels connected with the ends of the prong carrying rolls to turn therewith and engaging the sprocket chains, and rotatable brushes arranged above the upper portion of the endless belt and serving to act upon the stock or leather thereon and to hold the sprocket chains in engagement with the sprocket wheels of the prong carrying rolls.

2. In a machine of the character described, a supporting structure, a traveling support having openings formed therein, a sprocket chain extending longitudinally of the traveling support and attached thereto, rolls arranged beneath the traveling support and provided with prongs to operate within the openings formed therein, sprocket wheels connected with the ends of the rolls and engaging the sprocket chain, and brush means arranged above the traveling support to act upon the stock or leather placed thereon.

3. In a machine of the character described, a supporting structure, end rolls connected therewith, sprocket wheels connected with the opposite ends of each end roll, an endless belt passed about the end rolls and having openings formed therein, sprocket chains engaging the sprocket wheels and attached to the endless belt near its edges, prong carrying rolls arranged beneath the upper portion of the endless belt with the prongs operating within the openings of the endless belt, sprocket wheels secured to the opposite ends of the prong carrying rolls and engaging the upper portion of the sprocket chains, and rotatable brushes arranged near and above the upper portion of the endless belt.

4. In a machine of the character described, a supporting structure, end rolls connected therewith, sprocket wheels connected with the opposite ends of each end roll, an endless belt passed about the end rolls and having openings formed therein, sprocket chains engaging the sprocket wheels and attached to the endless belt near its edges, alternately arranged sets of plain and prong carrying rolls disposed beneath the upper portion of the endless belt with the prongs operating within the openings of the endless belt, sprocket wheels connected with the ends of the plain and prong carrying rolls and engaging the sprocket chains, and rotatable brushes arranged near and above the endless belt.

In testimony whereof I affix my signature in presence of two witnesses.

CARLETON RUHE.

Witnesses:
N. O. JESSOP,
WM. M. ABRAMS, Jr., 2nd.

Copies of this patent may be obtained for five cents each, by addressing the "Commissioner of Patents, Washington, D. C."